Dec. 28, 1954

H. E. SLOAN 2,698,185

COMBINATION WORKPIECE CENTERING AND
WORKPIECE COMPENSATING JAW-CHUCK

Filed May 29, 1951

Inventor
Harry E. Sloan
by Earle & Steward
Attorneys

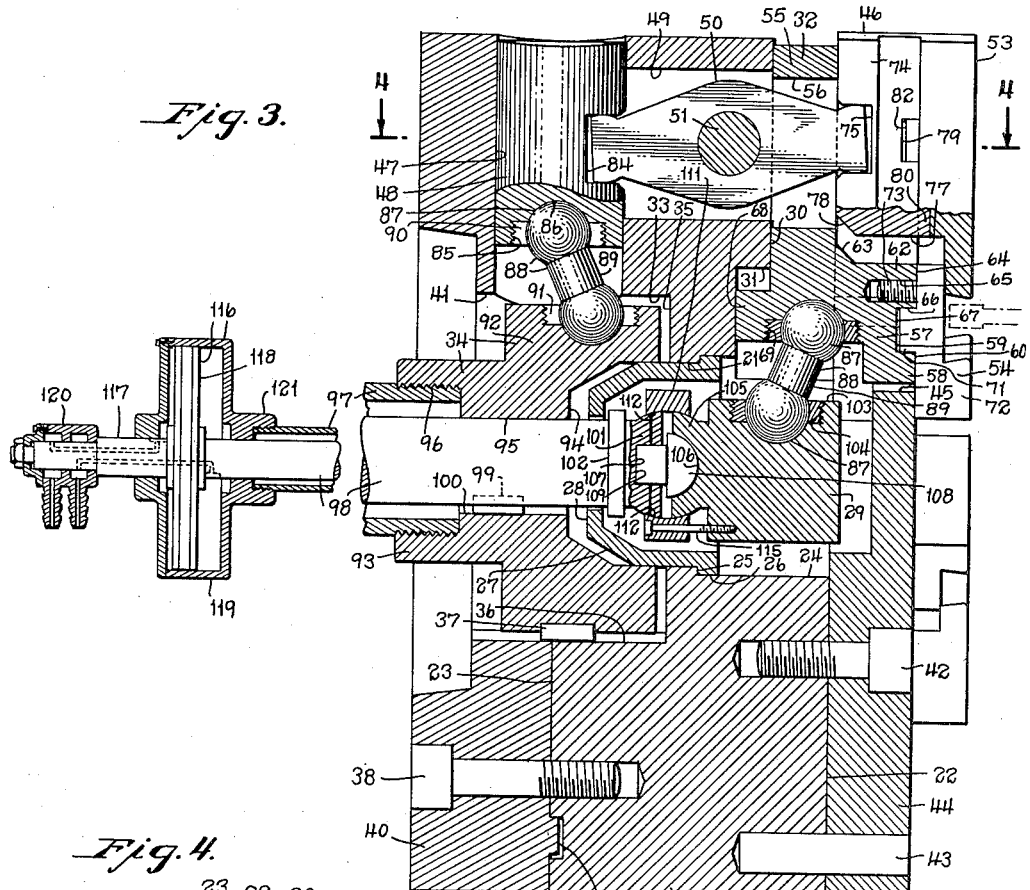
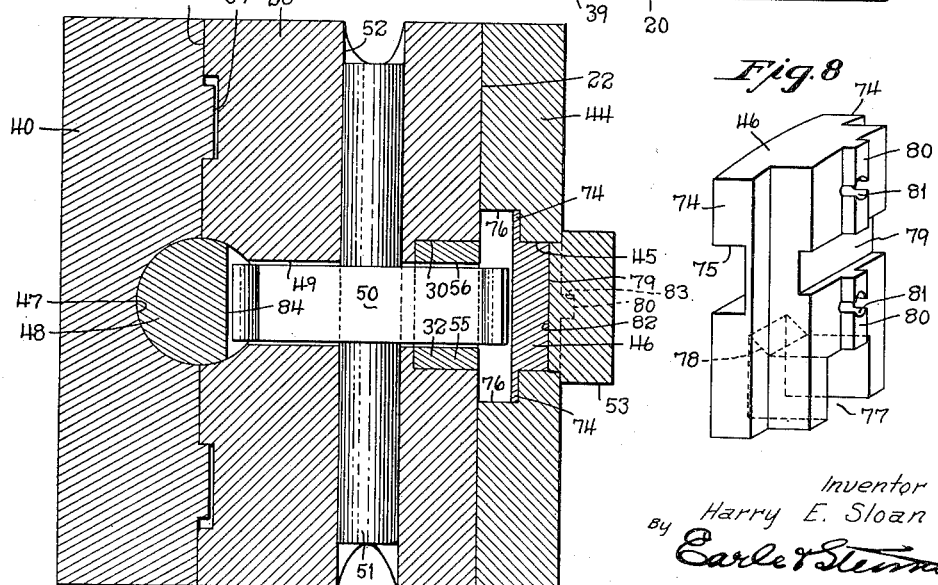

Dec. 28, 1954    H. E. SLOAN    2,698,185
COMBINATION WORKPIECE CENTERING AND
WORKPIECE COMPENSATING JAW-CHUCK
Filed May 29, 1951    3 Sheets-Sheet 3
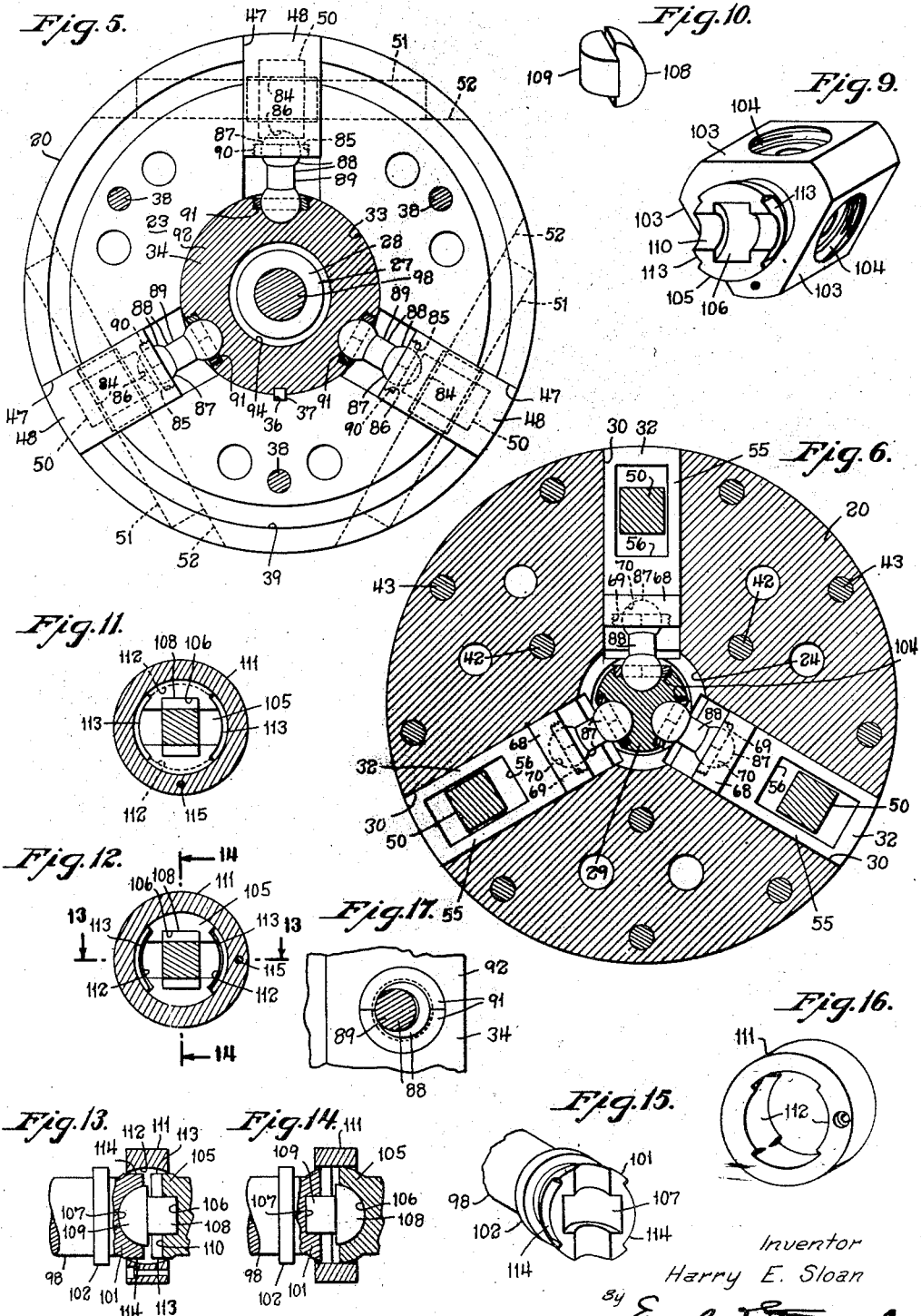
Inventor
Harry E. Sloan
By Earle T. Stewart
Attorneys United States Patent Office 2,698,185
Patented Dec. 28, 1954

2,698,185

COMBINATION WORKPIECE CENTERING AND WORKPIECE COMPENSATING JAW-CHUCK

Harry E. Sloan, Hartford, Conn., assignor to The Cushman Chuck Company, Hartford, Conn., a corporation of Connecticut Application May 29, 1951, Serial No. 228,839

18 Claims. (Cl. 279—4)

The present invention relates to improvements in chucks having movable jaws for holding work-pieces to be machined or for holding tools for performing operations upon such work-pieces.

An object of the invention is to provide a superior chuck of the character referred to having movable jaws which are adapted to grip a work-piece firmly but to automatically compensate for irregularities of the work-piece so as to avoid distortion thereof.

A further object of the invention is to provide a superior chuck of the character referred to having two sets of movable jaws for simultaneously gripping the external and internal surfaces of a work-piece.

A still further object of the invention is to provide a superior chuck having two sets of movable jaws arranged to grip both the inner and outer surfaces of a work-piece with substantially equal force.

A still further object of the invention is to provide a superior chuck having two sets of movable jaws, one set of jaws being arranged to grip a surface of a work-piece and center the work-piece in the chuck, the other set of jaws being arranged to grip a second surface of the work-piece and automatically compensate for irregularities thereof.

A still further object of the invention is to provide a superior chuck of the type referred to having two sets of movable jaws, one set of jaws being arranged to grip the outer surface of a work-piece and center the work-piece in the chuck, the other set of jaws being arranged to grip the inner surface of the work-piece and automatically compensate for irregularities thereof.

And a still further object of the invention is to provide a superior chuck of the type referred to having two sets of movable jaws which will grip relatively-thin ring-like work-pieces firmly but without distortion thereof.

A still further object of the invention is to provide a chuck of the type referred to with superior control-means for automatically actuating two sets of movable jaws so that the jaws will simultaneously grip the inner and outer surfaces of a work-piece with substantially equal force.

Other objects and advantages will appear to those skilled in the art from the following, considered in conjunction with the accompanying drawings.

In the accompanying drawings, in which certain modes of carrying out the present invention are shown for illustrative purposes:

Fig. 3 is a view of the chuck similar to Fig. 2 but with the gripping-jaws shown in their open position;

Fig. 4 is a top plan view of the chuck of Fig. 3 on section line 4—4;

Fig. 5 is a transverse sectional view of the chuck on line 5—5 of Fig. 2;

Fig. 6 is a transverse sectional view of the chuck on line 6—6 of Fig. 2;

Fig. 8 is a perspective view of the jaw-carriers of the outer gripping-jaws;

Fig. 9 is a perspective view of the tiltable operating-head of the inner compensating gripping-jaws;

Fig. 10 is a perspective view of the composite key of the universal joint of the tiltable operating-head;

Fig. 11 is a transverse section of the universal joint of the tiltable operating-head on line 11—11 of Fig. 2;

Fig. 12 is similar to Fig. 11, but shows the connecting-ring of the universal joint turned through substantially 90° for disengaging the elements of the universal joint;

Fig. 13 is a transverse section on line 13—13 of Fig. 12;

Fig. 14 is a transverse section on line 14—14 of Fig. 12;

Fig. 15 is a perspective view of one of the semi-spherical connecting-elements of the universal joint of the tiltable operating-head;

Fig. 16 is a perspective view of the connecting-ring of the universal joint of the tiltable operating-head; and Fig. 17 is a plan view of the split nut-and-ball assembly of a toggle joint on line 17—17 of Fig. 2.

Figure 2:
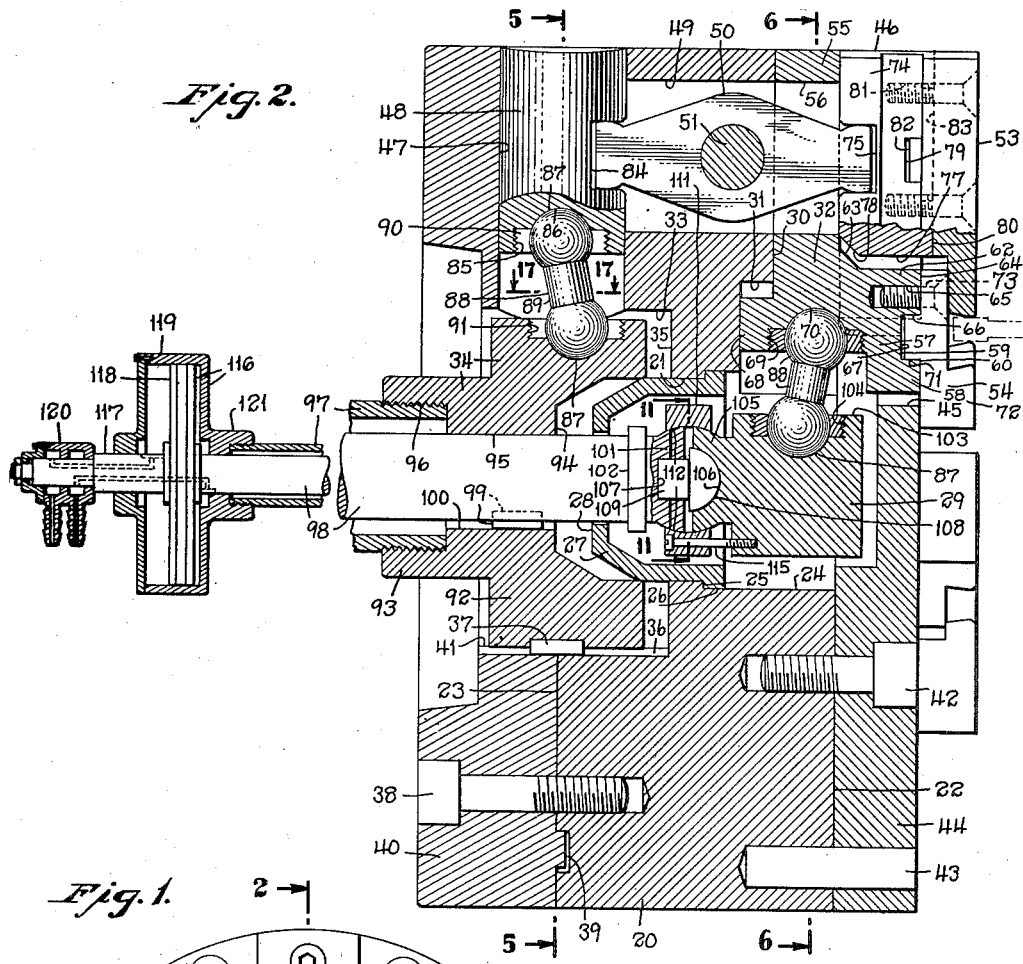
Fig. 2 is a view mainly in central-longitudinal section on line 2—2 of Fig. 1, but on a larger scale and with some of the parts left in elevation and with the gripping-jaws shown in their closed position.

The particular chuck chosen for purposes of making clear a preferred form of the present invention includes a substantially-cylindrical chuck-body generally designated by the reference character 20, having an axial aperture 21 extending longitudinally therethrough and substantially at right angles to the front and rear faces 22 and 23 respectively of the chuck-body. The portion of the axial aperture 21 of the chuck which intersects its front face 22 has a counterbore 24 which extends from the front face of the chuck-body rearwardly substantially half the thickness of the body and provides an annular substantially-square shoulder 25. The latter constitutes a seat for the flanged rim 26 of a stop-sleeve 27 which is adapted to be secured in the axial aperture 21 of the chuck-body by a press-fit, or the equivalent, the rear end of the stop-sleeve being joined by converging side walls to an integral apertured end wall 28 which constitutes a stop for limiting the rearward displacement of a tiltable operating-head indicated generally at 29 and hereinafter described. The counterbore 24 is intersected by the inner ends of three jaw-carrier guide-grooves 30 which extend substantially radially of the chuck-body, and in substantially equal angular relationship, each jaw-carrier guide-groove 30 being a groove which intersects the front face 22 of the chuck-body and is substantially U-shaped in cross section, as indicated especially well in Fig. 4. The aforesaid inner end of each radial jaw-carrier guide-groove 30 is deeper than its outer end, so as to provide a substantially-vertical stop-shoulder 31 intermediate its opposite ends for limiting the outward movement of the corresponding jaw-carrier 32 of the hereinafter described inner compensating gripping-jaws of the chuck. The outer end of each radial guide-groove 30 intersects the outer wall or peripheral surface of the chuck-body, as seen especially well in Figs. 2 and 3.

The opposite or rear end of the axial aperture 21 of the chuck-body is provided with a counterbore 33 which is of much larger diameter than the counterbore 24, but less deep than the latter. The counterbore 33 constitutes a cylindrical bearing-surface for supporting and guiding a non-tiltable operating-head 34 for reciprocable movement therein, the inner end of the counterbore 33 forming an annular substantially-square stop-shoulder 35 for limiting the movement of the non-tiltable operating-head 34 forwardly in the counterbore 33 of the chuck-body, as and for the purpose hereinafter described. In this connection, the wall of the counterbore 33 is provided with a longitudinal keyway 36 for accommodating the key 37 of the aforesaid non-tiltable operating-head 34 to prevent rotation of the latter in the counterbore 33.

Secured to the rear face 23 of the chuck-body by bolts 38 and by tongue and mortise locking-means indicated generally at 39, is a substantially disk-shaped rear cover-plate 40 having a central counterbored aperture 41, the diameter of which is greater than the outside diameter of the aforesaid non-tiltable operating-head 34, to permit the latter to pass freely therethrough. As shown especially well in Fig. 2, it will be seen that the diameter of the counterbored aperture 41 of the rear cover-plate 40 and the diameter of the counterbore 33 in the rear face 23 of the chuck-body are substantially equal, and that the walls of the aperture 41 and counterbore 33 are substantially coextensive. In this connection, the wall of the aperture 41 is provided with a keyway which is adapted to form an extension of the keyway 36 of the counterbore 33, for accommodating the key 37 of the non-tiltable operating-head 34.

Figure 1:
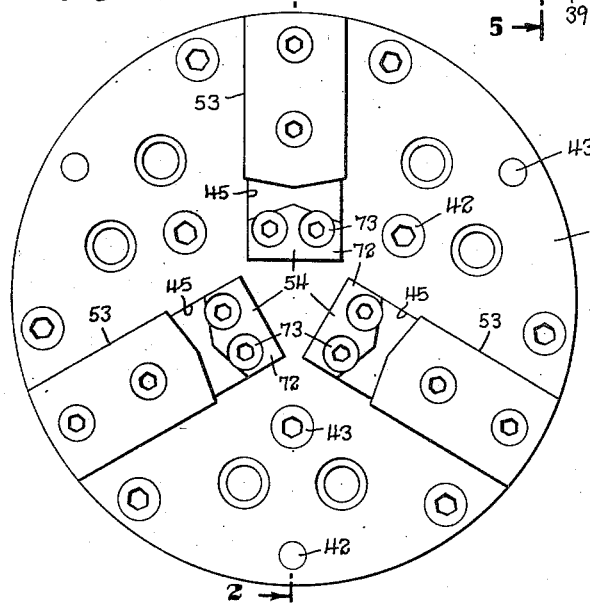
Fig. 1 is a face view of one form of chuck embodying the present invention.

Secured to the front face 22 of the chuck-body 20 by bolts 42 and centering-pins 43 is a front cover-plate 44 which, as shown especially well in Fig. 1, is a one-piece substantially disk-shaped plate having three radial guide-slots 45 arranged in substantially equal angular relationship about the center of the plate, each guide-slot having a blind inner end and open outer end and serving to guide the inner and outer jaw-carriers of the gripping-jaws. In this connection, the width of each guide-slot 45 is substantially uniform throughout and equal in width to the respective hereinafter described foot-portions of the inner jaw-carriers 32 of the chuck and to the respective hereinafter described body-portion of the outer jaw-carriers 46 of the chuck.

Turning again to Figs. 2 and 3, the aforesaid coextensive walls of the counterbore 33 of the chuck-body and the aperture 41 of the rear cover-plate 40 are intersected by the inner ends of three substantially-cylindrical guide-bores 47 which extend in substantially equal angular relationship radially of the chuck-body and intersect the outer surfaces of the chuck-body and the rear cover-plate, respectively, as indicated especially well in Fig. 2, each guide-bore 47 being adapted to guide an operating-plunger 48 for longitudinal sliding movement radially of the chuck.

Referring particularly to Figs. 4 and 5, the chuck-body 20 is provided with three clearance-apertures 49 which extend therethrough from its front face to its rear face, each aperture being substantially parallel to the longitudinal axis of the chuck and intersecting a radial guide-groove 30 and its corresponding guide-bore 47 adjacent the outer portions thereof. Each clearance-aperture 49 is substantially rectangular in cross section and accommodates a jaw-unit operating-lever 50 for operating the outer jaw-carrier 46. To this end, each operating-lever 50 is rotatably supported substantially intermediate its opposite ends by a pivot-pin or rod 51 in a clearance-aperture 49 for rocking movement therein, each pivot-rod 51 being secured at its opposite outer ends in an aperture 52 which extends through the chuck-body substantially transversely of the longitudinal axes of a radial guide-groove and its corresponding guide-bore. In accordance with this construction, the rear end of each rockable operating-lever 50 is adapted to oscillate in a radial guide-bore 47, while the forward end of each operating-lever extends through the corresponding guide-groove 30 of the chuck-body to oscillate in the corresponding guide-slot 45 of the front cover-plate. As hereinafter described, the forward end of each operating-lever 49 is operatively connected to its respective jaw-carrier 46 of the corresponding outer work-piece centering-jaws 53 of the chuck, whereby oscillation of the operating-lever moves its respective centering-jaws radially in a guide-slot 45 of the front cover-plate 44, as and for the purpose hereinafter described.

The numeral 54 indicates the inner work-piece compensating-jaws which are similarly moved in the guide-slots 45 of the front cover-plate by the aforesaid inner jaw-carriers 32, which are moved longitudinally in the radial guide-grooves 30 of the chuck-body by the operating-means hereinafter described.

Figure 7:
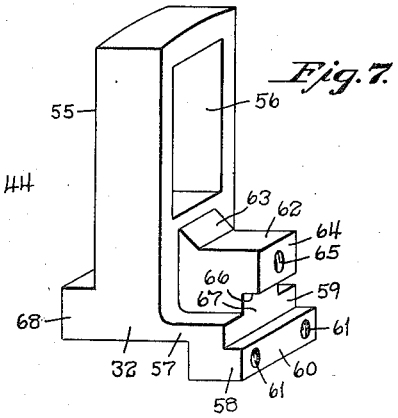
Fig. 7 is a perspective view of the jaw-carriers of the inner gripping-jaws.

Referring particularly to Fig. 7, each inner jaw-carrier 32 is substantially L-shaped and comprises an upstanding leg-portion 55 which is substantially rectangular in cross section and dimensioned to make a smooth sliding fit in a radial guide-groove 30 of the chuck-body, with the front face of the leg-portion 55 of the carrier 32 substantially flush with the front face of the chuck-body. An aperture 56 extends through the upstanding leg 55 from its front face to its rear face and is substantially rectangular in cross section, the width of the aperture 56 being such as to permit the forward end of one of the rockable operating-levers 49 to extend freely therethrough, while the height of the aperture 56 is sufficient to permit the forward end of the operating-lever to oscillate freely therein.

Projecting forwardly from the lower end of the leg-portion 55 of the inner jaw-carrier 32 is a substantially-rectangular toe-portion 57, the over-all length of which is substantially equal to the thickness of the aforesaid cover-plate 44; and the width of which corresponds to the width of a guide-slot 45 therein. The toe-portion 57 of the inner jaw-carrier 32 is thus adapted to be guided by a guide-slot 45 of the cover-plate for movement radially of the chuck. The forward end of the toe-portion 57 is provided with an integral depending enlargement having a lip-portion 58 which projects forwardly substantially perpendicularly to the vertical front end wall 59 of the toe and extends across the entire width thereof, the lip-portion 58 being provided in its front face 60 with two laterally-spaced internally-threaded apertures 61, 61, for the purpose hereinafter described. Upstanding from the top surface of the toe-portion 57 of each jaw-carrier is an integral substantially-rectangular rib 62 which extends longitudinally of its toe-portion and is substantially rectangular in cross section, the rear end of the rib being joined to the base of the leg-portion of the carrier by an upwardly-sloping substantially-flat fillet 63. The forward end of the rib extends beyond the front end wall 59 of the toe with its vertical face 64 lying in the vertical plane of the front face 60 of the lip 58. An internally-threaded aperture 65 is provided in the front face 64 of the rib, while the underside of the rib is cut away as at 66 to form one wall of a U-shaped key-way indicated generally at 67, the other walls of which comprise the surfaces 59 and 60 hereinabove described.

Projecting rearwardly from the base of the leg 55 is a heel-portion 68, the length of which corresponds substantially to the depth of the inner end-portion of one of the radial guide-grooves so as to slidingly engage therein, the heel-portion 68 being adapted to engage the stop-shoulder 31 of the radial guide-groove to limit the outward movement of the inner jaw-carrier therein. Formed in the underside of the toe-portion 57 of each inner jaw-carrier substantially centrally thereof is an internally-threaded aperture 69, the botttom of which comprises a substantially semi-spherical bearing-surface 70 for accommodating the upper spherical end of a toggle hereinafter described.

When mounted in one of the radial guide-grooves 30 of the chuck-body, the toe-portion 57 of each jaw-carrier projects forwardly into the corresponding radial guide-slot 45 of the front cover-plate 44 with the front faces 60 and 64 of the lip 58 and rib 62, respectively, substantially flush with the outer face of the cover-plate. Secured to the aforesaid apertured faces of the lip 58 and rib 62 of each inner jaw-carrier, is its work-piece gripping-jaw 54. As shown in Figs. 1 and 2, each gripping-jaw 54 is a substantially-rectangular plate having a transverse rib 71 projecting from its rear face dimensioned to make a close fit in the aforesaid keyway 67 in the front end of the toe-portion 57 of the jaw-carrier 32. The inner end of each gripping-jaw 54 has an enlargement 72 projecting forwardly of the front face of the jaw, the upper edge of the enlargement being shaped to provide a relatively-blunt point symmetrical with respect to the longitudinal axis of the gripping-jaw. A pair of apertures is provided in the aforesaid enlargement 72 of each gripping-jaw for alignment with the apertures 61 in the lip-portion 60 of the jaw-carrier; and a third aperture is provided in the outer end of each gripping-jaw for alignment with the aperture 65 in the face 64 of the rib 62, whereby each gripping-jaw may be secured on the end of the toe-portion of one of the jaw-carriers 32 by bolts 73 or equivalent fastening-means.

The jaw-carriers 46 of the outer work-piece centering gripping-jaws 53 comprise substantially-rectangular blocks having laterally-projecting hold-down flanges 74—74 extending along opposite edges thereof, each block being provided with a transverse groove 75 in its back face substantially U-shaped in cross section to accommodate the forward end of one of the operating-levers 49, the forward terminal-end of which is cylindrically contoured to make an articulated connection with the transverse groove 75 in the rear face of the jaw-carrier for actuating the latter. The width of each of the outer jaw-carriers 46 corresponds substantially to the width of one of the guide-slots 45 in the aforesaid front cover-plate 44 of the chuck, so as to slide freely therein and to be guided thereby in a radial direction with respect to the body of the chuck. Moreover, the thickness of each outer jaw-carrier corresponds substantially to the thickness of the front cover-plate 44, whereby the front face of each jaw-carrier 46 is adapted to be substantially flush with the outer face of the front cover-plate. In this connection, the rear face of the front cover-plate 44 is provided with relief-grooves 76 extending along the opposite edges, respectively, of each of its aforesaid radial guide-slots 45 for accommodating the hold-down flanges 74 of each jaw-carrier. In accordance with this construction, the longitudinal edges of each guide-slot 45 of the front cover-plate project over the longitudinal hold-down flanges 74—74 of the corresponding jaw-carrier and serve to hold it down against the front face of the leg-portion 55 of the corresponding inner jaw-carrier 32 for relative sliding movement thereover. In this connection, the lower end of each outer jaw-carrier 46 is intersected by a clearance-notch 77 coaxial with the longitudinal axis of the jaw-carrier. The width of the notch 77 of each outer jaw-carrier 46 corresponds substantially to the width of the rib 62 of one of the inner jaw-carriers 32 so as to cooperatively engage therewith for guiding the lower end of the outer jaw-carrier when moving relative to its corresponding inner jaw-carrier. Moreover, the height of each clearance-notch 77 exceeds the height of the rib 62 of the corresponding inner jaw-carrier so as to insure the inner and outer gripping-jaws moving together into substantially-closed relationship for gripping relatively thin-walled workpieces. Also, as is noted especially well in Fig. 2, the bottom rear corner of the flanged back face of each outer jaw-carrier is beveled off as at 78 to allow the above-described movement of the jaw-carriers, the slope of the bevel 78 corresponding substantially to the slope of the fillet 63 of the inner jaw-carrier 32.

The front face of each outer jaw-carrier 46 is provided substantially intermediate its upper and lower ends with a transverse U-shaped keyway 79; and projecting forwardly from the front face of each carrier 46 is a longitudinal rib 80 substantially coaxial with the longitudinal axis of the jaw-carrier, the rib being provided adjacent its upper and lower ends with internally-threaded apertures 81. When the outer jaw-carriers 46 are mounted in the radial slots 45 of the front cover-plate in axial alignment with the inner jaw-carriers 32, the rib 80 of each outer jaw-carrier 46 projects above the plane of the outer face of the cover-plate for engagement in the keyway of its respective outer gripping-jaws 53.

The outer gripping-jaws 53 of the jaw-carriers 46 are shown especially well in Figs. 2 and 3 and each comprises a substantially-rectangular plate, the over-all thickness of which corresponds substantially to the thickness of one of the inner gripping-jaws 72. The rear face of the outer end-portion of each outer gripping-jaw 53 has a transverse rib 82 adapted to engage in the transverse keyway 79 in the front face of its respective outer jaw-carrier, and a substantially coaxial longitudinal keyway 83 to accommodate the forwardly-projecting rib 80 of the jaw-carrier for locking the gripping-jaw thereon. Also, suitable apertures are provided on the longitudinal axis of each outer gripping-jaw 53 in alignment with the apertures 81 in the rib of its jaw-carrier 46 to accommodate bolts or other fastening-means for securing the gripping-jaw thereto. The inner end-portion of each gripping-jaw is thinned so as to lap over the outer end-portion of the corresponding inner gripping-jaw 54, and more particularly to slidingly engage with the outer face thereof, in the manner shown especially well in Figs. 1 and 2. Further, the inner end of each outer gripping-jaw is shaped to provide a relatively-blunt joint symmetrical with respect to the longitudinal axis of the gripping-jaw. Thus, when the outer and inner gripping-jaws are brought together, each set of gripping-jaws will make substantially line-contact with the outer and inner surfaces, respectively, of a work-piece engaged thereby.

The operating-means of the inner and outer gripping-jaws of the chuck are as follows. The outer work-piece centering gripping-jaws 53 are actuated by the operating-levers 50 which are connected at their forward ends to the outer jaw-carriers 46 and at their rear terminal-ends to the operating-plungers 48 which are reciprocably mounted in the aforesaid guide-bores 47, each operating-plunger being provided in its front face substantially opposite one of the aforesaid clearance-apertures 49 of the chuck-body with a transverse groove 84 to accommodate the cylindrically-contoured rear terminal-end of the corresponding operating-lever 50, whereby the latter makes an articulated connection therewith.

The inner end of each operating-plunger 48 is provided with an internally-threaded aperture 85, the bottom 86 of which constitutes a substantially semi-spherical bearing-surface for the upper spherical end 87 of a toggle-link. The latter is indicated generally at 88 and comprises a rod 89 having substantially-spherical enlargements 87 at opposite ends thereof, respectively. The spherical enlargement 87 at the outer end of each toggle-link is adapted to seat in the semi-spherical bottom 86 of the aperture 85 in the inner end of each jaw-operating plunger 48 and to be retained therein by means of a split-nut 90 such as shown in Fig. 5.

The spherical enlargement 87 at the opposite end of each toggle-link 88 is adapted to be operatively secured by a split-nut 90 in a similar type of aperture 91 in the wall of the non-tiltable operating-head 34. As shown especially well in Figs. 2, 3 and 5, substantially-flat surfaces are formed in the cylindrical surface of the operating-head at the intersection of the open ends of the apertures 91 therewith. Since in the present embodiment of the invention there are three outer gripping-jaws, there are likewise three jaw-operating plungers 48 and three toggle-links 88 arranged in substantially-equal angular relationship about the longitudinal axis of the operating-head 34 for connecting the plungers thereto. Thus, upon moving the operating-tube longitudinally relative to the chuck, the toggle-links 88 of the operating-head 34 are drawn up into relatively upright positions, as shown in Fig. 2, to move the outer gripping-jaws inwardly; or are pulled down in the manner shown in Fig. 3 to move the outer gripping-jaws outwardly.

Referring particularly to Fig. 2, the non-tiltable operating-head 34 is adapted, by its reciprocable movement as hereinafter described, to actuate the operating-levers 50 to simultaneously move the outer jaw-carriers 46, and comprises a substantially-cylindrical head-portion 92 having a rearwardly-extending reduced neck-portion 93. The forward face of the head-portion 92 of the operating-head 34 is provided with a concentric clearance-recess 94, the maximum diameter of which corresponds substantially to the outside diameter of the stop-sleeve 27 of the chuck-body for reciprocable movement thereover. The inner walls of the clearance-recess 94 are shaped to correspond substantially to the profile of the side walls and apertured end wall of the aforesaid stop-sleeve 27, while the depth of the clearance-recess 94 is such as to accommodate the rear end-portion of the stop-sleeve 27 when the operating-head 39 is advanced thereover, as shown in Fig. 3. Extending through the non-tiltable operating-head is an axial aperture 95 having an internally-threaded counterbore 96 in the reduced neck-portion 93 in which is engaged the forward threaded end of an operating-tube 97, the opposite or rear end of which is connected to suitable pneumatic operating actuating-means, hereinafter described, for automatically reciprocating the non-tiltable operating-head 34 in the counterbore 33 of the chuck.

Slidingly engaged in the axial aperture 93 of the operating-head 34 is an operating-rod 98 having a key 99 which is adapted to slidingly engage in a longitudinal keyway 100 in the axial aperture of the operating-head to lock the latter to the rod against rotation thereto. The rear end of the operating-rod 98 is connected to the aforementioned pneumatically-operated actuating-means for moving the operating-rod 98 longitudinally of the chuck for effecting the actuation of the inner work-piece compensating gripping-jaws. To this end, the forward end of the operating-rod 98 extends through the aperture in the end wall 28 of the stop-sleeve 27, and terminates at its forward extremity in a substantially semi-spherical enlargement 101 as shown in Figs. 2 and 3. Rearwardly of the semi-spherical enlargement 101 is a stop-collar 102 which is secured to the operating-rod and serves to bring up against the end wall thereof forwardly of the apertured end wall 28 of the sleeve 27 to limit the movement of the operating-rod in a rearward direction. Operatively connected to the aforesaid semi-spherical enlargement 101 of the operating-rod is the tiltable operating-head 29. As shown especially well in Figs. 9 and 10, the tiltable operating-head 29 is a solid block substantially triangular in cross section, each of the three flat sides 103 of the block being provided with an internally-threaded aperture 104, the bottom 105 of which comprises a semi-spherical bearing-surface for accommodating the spherical end of a toggle-link which is substantially identical to the toggle-links 88 hereinabove described, and secured in the aperture 104 by a split-nut. Projecting from the rear end of the triangular tiltable operating-head 29 is a reduced neck-portion, the rear extremity of which comprises a semi-spherical enlargement 105 substantially identical to the semi-spherical enlargement 101 of the operating-rod. Moreover, both the face of the latter and the face of the semi-spherical enlargement 105 of the tiltable operating-head 29 are provided with key-recesses 106 and 107, respectively, each key-recess being coaxial with the diameter of its respective semi-spherical enlargement and shaped to accommodate one of two substantially semicircular keys 108 and 109, respectively, such as shown in Fig. 10. In this connection, it will be noted that the key 108 adapted to engage in the key-recess 106 in the face of the semi-spherical enlargement 105 of the tiltable operating-head lies in a plane substantially at right angles to the plane of the key 109 adapted to engage in the key-recess 107 in the face of the opposed semi-spherical enlargement 101 of the operating-rod, the two keys being formed from a single piece of stock or otherwise integrally joined together on their diameters. Fig. 9 is a perspective view of the semi-spherical enlargement 105 of the tiltable operating-head showing a diametric relatively shallow clearance-slot 110 in the face thereof and at substantially right angles to the longitudinal axis of its recess 106.

The semi-spherical enlargements of the operating-rod and tiltable operating-head, respectively, are adapted to be secured together with their respective faces in opposed relationship, as shown especially well in Figs. 2 and 3 and in a manner to permit the tiltable operating-head 29 to tilt out of axial alignment with the operating-rod; and with one semi-spherical enlargement being held from rotating relative to the other by engagement of the double keys in their respective key-recesses in the opposed faces of the semi-spherical enlargements 101 and 105. To this end, the two semi-spherical elements are held in cooperative relationship by means of a coupling-ring 111 which, as shown especially well in Figs. 11, 12, 13, 14 and 16, is provided on its inner wall at substantially diametrical sides thereof with inwardly-projecting flanges 112—112 which correspond in width substantially to the width of the ring and which, in the present embodiment of the invention, subtend angles of substantially 90°, the exposed face of each flange being a portion of a spherical surface, the radius of which is substantially equal to the radii of the two semi-spherical enlargements 101 and 105. Further, the diametrical distance between the segmental spherical surfaces of the flanges 112—112 of the coupling-ring 111 is only slightly greater than the diameters of the semi-spherical enlargements of the operating-rod and tiltable operating-head for permitting the coupling-ring to be assembled thereon. To this end, each semi-spherical enlargement is provided at substantially diametrically-opposite sides with substantially-flat surfaces 113—113 and 114—114, respectively, to enable the flanges 112—112 of the ring to slide thereover for assembling the ring on the opposed ends of the semi-spherical elements of the operating-rod and tiltable operating-head. With the parts so assembled, the coupling-ring is rotated through substantially 90°, whereby the diametrically-opposite spherical surfaces of the flanges 112—112 cooperatively engage the adjacent spherical surfaces of the opposed semi-spherical enlargements of the operating-rod and tiltable operating-head to couple these elements against separation longitudinally. In order that the coupling-ring may be held against rotation and inadvertent uncoupling of the semi-spherical elements of the operating-rod and tiltable operating-head, the coupling-ring is provided with an aperture extending transversely through its wall and adapted to accommodate a bolt 115 or equivalent fastening-means which is threadedly secured in an internally-threaded aperture of the body-portion of the tiltable operating-head, as shown especially well in Fig. 3. With the parts assembled thusly, the tiltable operating-head is coupled to the operating-rod 93 for movement in the direction of the longitudinal axis thereof and for rotation thereby, and is also free to tilt in substantially any direction about the longitudinal axis of the operating-rod, this freedom of movement of the tiltable operating-head being permitted by the dual keys 108 and 109 which serve to hold the opposed faces of the respective semi-spherical enlargements of the operating-rod and tiltable operating-head in spaced relationship. As previously mentioned, the body-portion of the tiltable operating-head is provided with three apertures 104 having semi-spherical sockets for supporting the spherical ends of the three toggle-links 88 which connect the tiltable operating-head to the jaw-carriers 32 of the inner compensating gripping-jaws. Thus, as the operating-rod is moved forwardly relative to the chuck, the toggle-links 88 of the tiltable operating-head are moved into relatively upright positions, thereby causing the inner compensating gripping-jaws to move outwardly radially. Upon retracting the operating-rod, the inner compensating gripping-jaws will be moved inwardly radially. Moreover, each compensating gripping-jaw is free to move relative to the other compensating gripping-jaws due to the freedom of movement of the tiltable operating-head, thereby to compensate for variations in the symmetry of the surface of the work-piece being engaged by the inner gripping-jaws of the chuck. In contradistinction to the action of the inner compensating gripping-jaws, the outer work-piece centering-jaws always move substantially simultaneously and in equal amounts toward and away from each other in response to actuation of the non-tiltable operating-head, whereby the outer jaws serve to automatically center a work-piece relative to the axis of the chuck.

As stated at the outset, both the outer work-piece centering-jaws 53 and the inner work-piece compensating-jaws 54 of the chuck are adapted to grip a work-piece simultaneously with substantially equal force on the inside and outside. To these ends, the operating-rod 98 of the tiltable operating-head 29 and the operating-tube 97 of the non-tiltable operating-head 34 may be actuated substantially simultaneously and by equal forces. In the embodiment of the invention shown herein, the means for applying substantially-equal forces to the operating-rod and operating-tube of the jaw-carriers of the chuck comprises pneumatically-operated means consisting of an air cylinder and piston assembly which, as shown especially well in Figs. 2 and 3 and indicated generally at 116, embodies a piston-rod 117 to which is secured a piston 118 adapted to have relative longitudinal sliding movement in an air cylinder 119. The rear end of the piston-rod projects rearwardly of the air cylinder and is rotatably connected to a dual passage fitting 120 adapted to supply air in a predetermined sequence to the air cylinder on opposite sides respectively of the piston, in a manner well known in the art. The opposite or forward end of the piston-rod projects beyond the corresponding end of the air cylinder and is threadedly secured to the rear end of the operating-rod 98 of the chuck. The rear end of the operating-tube 97 of the chuck is threadedly secured in an internally-threaded collar 121 which projects forwardly from the front face of the air cylinder, whereby movement of the air cylinder is transmitted by the operating-tube to the non-tiltable operating-head of the chuck. In this connection, it will be clear that both, the cylinder 119 and the piston 118 therein are longitudinally movable, as well as rotatable, with their respective operating heads 34 and 29. Further, the cylinder 119 and the piston 118 are longitudinally movable relative to each other, but are rotatable in unison due to the spline connection 99 between the operating rod 98 and the operating head 34 on the operating tube 97. Thus, the admission of air into the air cylinder creates substantially simultaneous and equal forces acting against the opposed faces of the piston and cylinder, to move the piston and cylinder in opposite directions, thereby moving the tiltable and non-tiltable operating-heads of the chuck in corresponding directions for causing a work-piece to be gripped substantially simultaneously internally and externally by the gripping-jaws of the chuck.

For the purposes of description, let it be assumed that the reciprocating non-tiltable operating-head 34 is moved forwardly to its position shown in Fig. 3, whereby the jaw-operating plungers 48 are retracted inwardly radially and the jaw-operating levers 50 are rocked in a counter-clockwise direction to move the outer work-piece centering-jaws outwardly radially; and that the tiltable operating-head 29 has been moved rearwardly, thereby retracting its jaw-carriers 32 and moving the inner work-piece compensating-jaws inwardly radially. With the parts in these related positions, the respective sets of gripping-jaws 53 and 54 are open, that is to say, corresponding jaws of the inner and outer sets of jaws are spaced apart to permit the insertion of a work-piece therebetween, as indicated by the broken lines in Fig. 3, the work-piece being, for example, a hollow cylindrical element or tubular stock, as the case may be.

To grip the work-piece firmly between the two sets of gripping-jaws of the chuck, air is admitted to the left end of the cylinder 119 of the pneumatic operating-means (Fig. 2). In doing so, the piston and cylinder are moved longitudinally in opposite directions, moving thereby the non-tiltable operating-head 34 rearwardly in the chuck, and the tiltable operating-head 29 forwardly. The tiltable and non-tiltable operating heads 29 and 34 will, on the beforementioned admission of air into the cylinder 119, be moved either simultaneously or successively, depending on the resistance encountered by these heads in moving the parts connected therewith. As the respective operating-heads move longitudinally in opposite directions relative to each other, the toggle-links 88 of the rearwardly displaced non-tiltable operating-head 34 will displace the operating-plungers 48 outwardly radially thereby rocking the operating-levers 50 in a clockwise direction to move the outer work-piece centering gripping-jaws inwardly radially to engage with the outer surface of the work-piece. Before, after or simultaneously with the aforementioned rearward displacement of the operating head 34 the forward displacement of the tiltable operating-head 29 will cause the toggle-links 88 to move the corresponding jaw-carriers 32 outwardly, thereby moving the inner work-piece compensating gripping-jaws outwardly radially into engagement with the inner surface of the work-piece. Regardless of whether the two sets of gripping-jaws move simultaneously or successively into engagement with the work, they will simultaneously exert their full and substantially equal gripping forces on the workpiece at that moment only when both sets of jaws are in engagement with the workpiece, as will be readily understood. Accordingly, while the jaws of the two sets may not simultaneously engage the workpiece, they will always exert their full gripping forces simultaneously on the workpiece. Assuming that the outer surface of the work-piece is substantially symmetrical, then the inward radial movement of the outer centering-jaws 53 will automatically center the work-piece with respect to the longitudinal axis of the chuck. Should one or more portions of the inner surface of the work-piece by non-symmetrical, eccentric, or otherwise off-center with respect to the central longitudinal axis of the chuck, then as the inner work-piece compensating-jaws move outwardly, one of the outwardly-moving gripping-jaws will engage against the inner surface of the work-piece before either or both of the remaining two gripping-jaws of the set. Full engagement of all of the inner gripping-jaws is, however, assured by the fact that the operating-head 29 of these jaws is free to tilt, whereby the respective work-piece compensating gripping-jaws are free to move relative to each other in accordance with the non-symmetrical or eccentric configuration of the inner surface of the work-piece, the tiltable operating-head being tilted in a direction and to a degree which are determined by the relative movements of the respective jaw-carriers. Thus, the inner and outer surfaces of the work-piece are firmly gripped between the two sets of gripping-jaws of the chuck and held thereby substantially centrally of the longitudinal axis of the chuck.

Although the embodiment of the invention shown and described herein provides a tilting operating-head for actuating the inner gripping-jaws of the chuck, it will be appreciated that the outer gripping-jaws of the chuck may be made the work-piece compensating-jaws, in which instance the operating-head of the outer jaws would be made tiltable to compensate for non-symmetrical and eccentric portions of the outer surface of the work-piece, while the inner gripping-jaws would be actuated by a non-tiltable operating-head and constitute the work-piece centering-jaws of the chuck.

The chuck structure hereinabove described has, therefore, these characteristically novel features, namely, a set of compensating-jaws operable in conjunction with a set of work-piece centering-jaws, both sets of jaws being actuated by pneumatically-operated means whereby the two sets of jaws will exert their full and equal gripping forces on a workpiece simultaneously and only when the jaws of both sets are in engagement with the workpiece, the work-piece compensating-jaws automatically compensating for irregularities in the surface contour of the work-piece so as to preclude any distortion of the work-piece itself.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. In a chuck having a body with a longitudinal axis carrying sets of inner and outer work-gripping jaws and guiding them for movement substantially radially of the body axis into positions of gripping engagement with and disengagement from hollow work, the combination of actuators operatively connected with the jaws of said sets, respectively, and movable relative to said body axially thereof toward and away from each other to move the jaws of said sets into said positions, respectively; and a cylinder and piston therein carried by and movable with said actuators, respectively, and adapted to move the latter to achieve work engagement by said jaws on admission of fluid under pressure into said cylinder.

2. The combination in a chuck as set forth in claim 1, in which said piston is double-acting, and said cylinder and piston are adapted to move said actuators to achieve work engagement and work disengagement by said jaws on admission of fluid under pressure into the opposite ends, respectively, of said cylinder.

3. In a chuck having a rotary body carrying sets of inner and outer work-gripping jaws and guiding them for movement substantially radially of the rotary axis of the body into positions of gripping engagement with and disengagement from hollow work, the combination of two actuators operatively connected with the jaws of said sets, respectively, and spline-connected with said body for rotation therewith and for independent movement axially of said body in opposite directions to move the jaws of said sets into said positions, respectively; and a cylinder and piston therein carried by and axially movable and turnable with said actuators, respectively, and adapted to move the latter in directions to achieve work engagement by said jaws on admission of fluid under pressure into said cylinder.

4. The combination in a chuck as set forth in claim 3, in which said piston is double-acting, and said cylinder and piston are adapted to move said actuators in said opposite directions to achieve work engagement and work disengagement by said jaws on admission of fluid under pressure into the opposite ends, respectively, of said cylinder.

5. In a chuck having a rotary body carrying sets of inner and outer work-gripping jaws and guiding them for movement substantially radially of the rotary axis of the body into positions of gripping engagement with and disengagement from hollow work, the combination of two actuators operatively connected with the jaws of said sets, respectively, and spline-connected with said body for rotation therewith and for independent movement axially of said body in opposite directions to move the jaws of said sets into said positions, respectively; a cylinder and piston therein carried by and axially movable and turnable with said actuators, respectively, and adapted to move the latter in directions to achieve work engagement by said jaws on admission of fluid under pressure into one end of said cylinder, said piston having a rod extending to the outside of said cylinder; and a valve body freely rotatable but axially immovable on said rod and having a chamber surrounding said rod and an inlet to said chamber, and said rod having a passage providing communication between said chamber and said one cylinder end for conducting fluid under pressure into and from the latter.

6. The combination in a chuck as set forth in claim 5, in which said piston is double-acting to achieve work engagement and work disengagement by said jaws on admitting fluid under pressure into the opposite ends, respectively, of said cylinder, said valve body has another chamber surrounding said rod and another inlet to said other chamber, and said rod has another passage providing communication between said other chamber and the other cylinder end for conducting fluid under pressure into and from the latter.

7. In a chuck having a body with a longitudinal axis carrying sets of inner and outer work-gripping jaws and guiding them for movement substantially radially of the body axis, the combination of means for moving the jaws of one set into and from gripping engagement with hollow work; an operating rod movable substantially axially of said body; an actuator floatingly carried by said rod for limited movement in any direction laterally of said body axis and operatively connected with the jaws of the other set for moving them into and from uniform engagement with hollow work of non-uniform wall thickness on moving said rod in opposite directions, respectively; and means for moving said rod in opposite directions.

8. The combination in a chuck as set forth in claim 7, in which said actuator is floatingly carried by said rod by having a universal-joint connection with one end of said rod.

9. In a chuck having a rotary body carrying sets of inner and outer work-gripping jaws and guiding them for movement substantially radially of the rotary axis of the body, the combination of means for moving the jaws of one set into and from gripping engagement with hollow work; an operating rod splined to said body for rotation therewith and for movement substantially axially of the latter; an actuator carried by said rod for rotation therewith and for limited floating movement in any direction laterally of said body axis; operative connections between said actuator and the jaws, respectively, of the other set for moving the jaws of the latter into and from uniform gripping engagement with hollow work of non-uniform wall thickness on moving said rod in opposite directions, respectively; and a device for moving said rod in opposite directions.

10. The combination in a chuck as set forth in claim 9, in which said actuator is floatingly carried by said rod by having a universal-joint connection with one end of said rod.

11. In a chuck having a body with a longitudinal axis carrying sets of inner and outer work-gripping jaws and guiding them for movement substantially radially of the body axis into positions of gripping engagement with and disengagement from hollow work, the combination of actuators operatively connected with the jaws of said sets, respectively, and movable relative to said body in the direction of said axis toward and away from each other to move the jaws of said sets into said positions, respectively, one of said actuators being floatable in any direction laterally of said body axis to permit uniform engagement of the jaws of the respective set with hollow work of non-uniform wall thickness; and a cylinder and piston therein axially movable with said actuators, respectively, and adapted to move the same to achieve work engagement by said jaws on admission of fluid under pressure into said cylinder.

12. The combination in a chuck as set forth in claim 11, in which said piston is double-acting, and said cylinder and piston are adapted to move said actuators to achieve work engagement and work disengagement by said jaws on admission of fluid under pressure into the opposite ends, respectively, of said cylinder.

13. In a chuck having a rotary body carrying sets of inner and outer work-gripping jaws and guiding them for movement substantially radially of the rotary axis of the body into positions of gripping engagement with and disengagement from hollow work, the combination of actuators operatively connected with the jaws of said sets, respectively, and spline-connected with said body for rotation therewith and for independent movement axially of said body toward and away from each other to move the jaws of said sets into said positions, respectively, one of said actuators being floatable in any direction laterally of said axis to permit uniform engagement of the jaws of the respective set with hollow work of non-uniform wall thickness; and a cylinder and piston therein axially movable and turnable with said actuators, respectively, and adapted to move the same to achieve work engagement by said jaws on admission of fluid under pressure into said cylinder.

14. In a chuck having a body with a longitudinal axis carrying sets of inner and outer work-gripping jaws and guiding them for movement substantially radially of the body axis into positions of gripping engagement with and disengagement from hollow work, the combination of a rod movable axially of said body; two actuators, one being movable axially of said body and the other being carried by and having a universal-joint connection with said rod, said actuators being operatively connected with the jaws of said sets, respectively, for moving said jaws into said positions on axially moving said actuators toward and away from each other, respectively, and said other actuator permitting uniform engagement of the jaws of the respective set with hollow work of non-uniform wall thickness; and a cylinder member and piston member therein, said members being axially movable with said one actuator and rod, respectively, and adapted to move them to achieve work engagement by said jaws on admission of fluid under pressure into said cylinder member.

15. The combination in a chuck as set forth in claim 14, in which said body is rotary about its longitudinal axis, said rod and said one actuator are splined to said body for rotation therewith, and said members are turnable with said one actuator and rod, respectively, with which they are axially movable.

16. The combination in a chuck as set forth in claim 15, in which said body is rotary about its longitudinal axis, said rod and said one actuator are splined to said body for rotation therewith, said members are turnable with said one actuator and rod, respectively, with which they are axially movable, and the operative connection between said other actuator and each jaw of the respective set is formed by a toggle link.

17. In a chuck having a body with a longitudinal axis carrying sets of inner and outer work-gripping jaws and guiding them for movement substantially radially of the body axis into positions of gripping engagement with and disengagement from hollow work, the combination of a rod movable axially of said body; a first actuator carried by and having a universal-joint connection with said rod; toggle links operatively connecting said actuator with the inner jaws, respectively, for moving the latter into and from uniform engagement with hollow work of non-uniform thickness on axially moving said rod in opposite directions, respectively; a second actuator movable axially of said body; operative connections between said second actuator and the outer jaws, respectively, for moving the latter into and from engagement with hollow work on axially moving said second actuator in opposite directions, respectively, each of said connections including a toggle link pivotally connected at one end with said second actuator, and the jaws of said sets being moved into said positions on axially moving said rod and said second actuator toward and away from each other, respectively; and a cylinder member and piston member therein, said members being axially movable with said rod and said one actuator, respectively, and adapted to move the same in directions to achieve work engagement by said jaws on admission of fluid under pressure into said cylinder member, whereby the jaws of either set exert their full gripping force on the work only when the jaws of both sets are in engagement with the work.

18. The combination in a chuck as set forth in claim 17, in which said body is rotary about its longitudinal axis, said rod and said second actuator are splined to said body for rotation therewith, and said members are rotatable with said rod and said one actuator, respectively, with which they are axially movable.

References Cited in the file of this patent

UNITED STATES PATENTS

| Number | Name | Date |
|---|---|---|
| 292,685 | Schrader | Jan. 29, 1884 |
| 396,035 | Felt | Jan. 8, 1889 |
| 442,230 | Libby | Dec. 9, 1890 |
| 566,702 | Sellers | Aug. 25, 1896 |
| 1,539,282 | Spurr | May 26, 1925 |
| 1,815,562 | Godfriaux | July 21, 1931 |
| 1,839,401 | Lewis | Jan. 5, 1932 |
| 1,869,445 | Tomkins | Aug. 2, 1932 |
| 2,122,360 | Sloan et al. | June 28, 1938 |
| 2,502,798 | Nabstedt et al. | Apr. 4, 1950 |
| 2,546,326 | Wetzel | Mar. 27, 1951 |

FOREIGN PATENTS

| Number | Country | Date |
|---|---|---|
| 352,815 | Germany | May 5, 1922 |